United States Patent [19]

Okamoto et al.

[11] 4,110,596
[45] Aug. 29, 1978

[54] APPARATUS FOR TRANSPORTING AND COLLECTING SELF-PROPELLED WELDING CARRIAGES

[75] Inventors: Jiro Okamoto, Akashi; Mamoru Hirose, Ashiya; Katsuji Miyamoto, Jobe; Shinichiro Kuroki, Kobe, all of Japan

[73] Assignee: Mitsubishi Jukogyo Kabushiki Kaisha, Tokyo, Japan

[21] Appl. No.: 757,509

[22] Filed: Jan. 7, 1977

Related U.S. Application Data

[63] Continuation-in-part of Ser. No. 613,019, Sep. 12, 1975, abandoned.

[30] Foreign Application Priority Data

Oct. 3, 1974 [JP] Japan .................................. 49-11335

[51] Int. Cl.² .............................................. B23K 9/12
[52] U.S. Cl. .................................... 219/124.4; 212/42; 212/129
[58] Field of Search ................. 212/11, 13, 14, 40-42, 212/124, 177, 129; 219/124, 125 R; 200/47

[56] References Cited

U.S. PATENT DOCUMENTS

| 786,809 | 4/1905 | Hertzog | 200/47 |
|---|---|---|---|
| 1,287,336 | 12/1918 | Kendall | 212/129 |
| 1,463,090 | 7/1923 | Natziger | 212/217 |
| 2,822,094 | 2/1958 | Greer | 212/42 X |
| 3,482,711 | 12/1969 | Bohme | 212/129 |

Primary Examiner—E. A. Goldberg
Attorney, Agent, or Firm—Cushman, Darby & Cushman

[57] ABSTRACT

The apparatus for transporting and collecting self-propelled carriages for carrying out fillet welding of a construction in the rectangular form has carriages adapted to move along rails extending in the longitudinal direction which rails are in turn movable in the transverse direction, extension ladders each suspended by the respective carriages through rotating means so as to be rotatable about its longitudinal axis, clamp jaws each supported by the respective extension ladders. The clamp jaws are adapted to releasably clamp the respective self-propelled carriages so that the carriages are lifted and swivelled to assume orientation required for the fillet welding in the desired direction and again lowered and released from the clamp jaws thereby permitting the fillet welding of a construction in the rectangular form in different regions.

1 Claim, 10 Drawing Figures

APPARATUS FOR TRANSPORTING AND COLLECTING SELF-PROPELLED WELDING CARRIAGES

REFERENCE TO RELATED APPLICATION

This is a continuation-in-part of our earlier, copending application Ser. No. 613,019, filed Sept. 12, 1975, and abandoned in favor hereof.

BACKGROUND OF THE INVENTION

This invention relates to an apparatus for transporting and collecting self-propelled carriages wherein the carriages move along the respective inner walls of a construction in the rectangular form so as to effect the fillet welding of the construction in the rectangular form in different regions by means of automatic welding devices each carried by the carriages.

In order to carry out fillet welding of a construction in the form of rectangular shape, such as rectangular blocks in a hull in the ship building, for example, there has been proposed several apparatus. However, the prior art apparatus requires additional operators for properly orienting the carriages as described later so as to prevent twisting of cables and wires leading to the carriages which might result in failure in the operation of the welding devices carried by the carriages.

This invention aims at avoiding the above-described disadvantages of the prior art apparatus.

SUMMARY OF THE INVENTION

The object of this invention is to provide a novel and useful apparatus for transporting and collecting carriages for the fillet welding of rectangular form, which avoids the above-described disadvantages of the prior art apparatus.

Another object is to provide a novel and useful apparatus of the type described above by which a plurality of carriages are operated by a single operator in the remote control manner thereby reducing the number of operators required for the operation and affording high efficiency and economic in operation.

DETAILED DESCRIPTION OF THE PREFERRED EMBODIMENT

Prior to the description of this invention, the prior art apparatus will be described briefly in connection with FIG. 1 for the better understanding of this invention.

Prior Art

Figure 1:
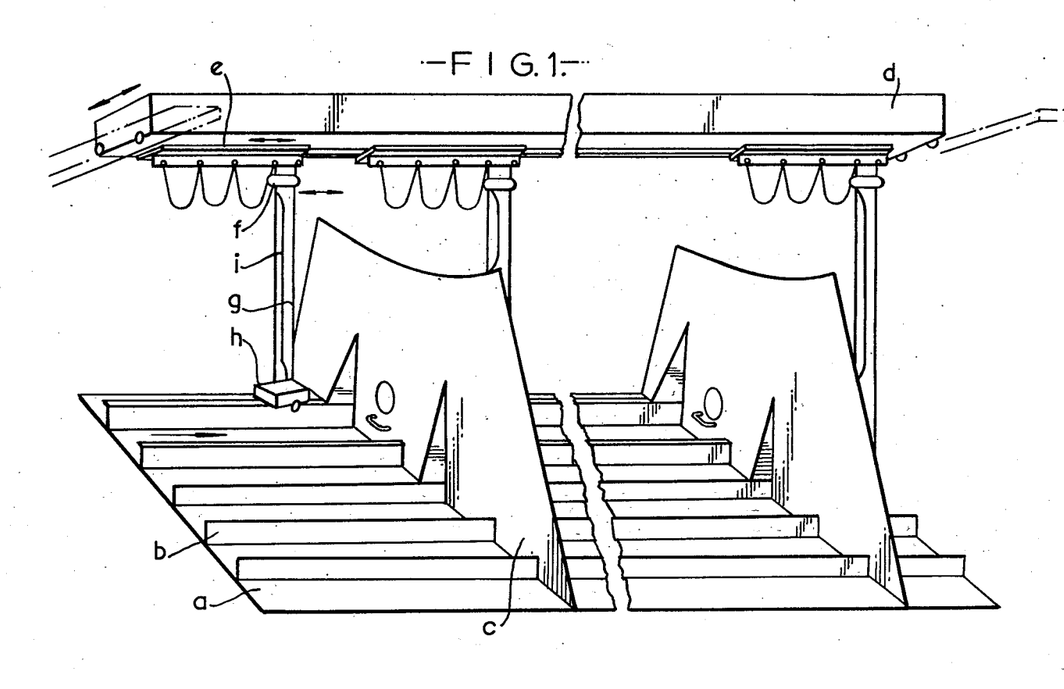
FIG. 1 is a perspective view showing the prior art fillet welding apparatus for fillet welding of the rectangular form.

In FIG. 1, a plurality of longitudinal guide members $b$ are located on plate material $a$ to be welded and extend in the longitudinal direction in parallel and spaced a predetermined distance from each other while a plurality of transverse guide members $c$ are located on plate material $a$ and extend in the direction transverse to the longitudinal direction at a predetermined distance. A main girder $d$ is provided above members $a$, $b$, $c$ so that it extends in the direction parallel to longitudinal members $b$ and it is shiftable in the direction parallel to transverse members $c$. Subgirders $e$ are mounted on the lower surface of main girder $d$ so that they can travel along the longitudinal direction of main girder $d$. Self-propelled carriages $h$ are suspended through two or more wires $g$ from the respective hoists $f$ which are attached to the respective subgirders $e$. Each of carriages $h$ is adapted to move in the respective rectangular regions for effecting the fillet welding in that region. To this end, electric cables $i$ are connected from the exterior of the apparatus to the respective carriages $h$ so as to supply electric power to the welding devices provided in the carriages.

When fillet welding has been carried out by the respective carriages in each of the regions of the rectangular form, hoists $f$ are operated to lift carriages $h$ and main girder $d$ and subgirders $e$ are moved appropriate distances and hoists $f$ are again operated to descend carriages $h$ onto the required regions in which fillet welding is to be carried out. Carriages $h$ move along the respective guide members $b$, $c$ so as to effect fillet welding along each side of the rectangular form.

With such an apparatus, however, in order to effect fillet welding in one rectangular region by each of carriages $h$, carriage $h$ must be rotated 1–4 right angles so as to move it along the respective sides of the rectangular region thereby causing twisting of wires $g$ and cables $i$. Therefore, if carriages $h$ are lifted by hoists $f$ with wires $g$ and cables $i$ being left twisted, carriages are rotated by the reaction force of wires $g$ and cables $i$ to assume their initial orientation, thereby causing collision thereof against longitudinal members $b$ or transverse members $c$ resulting in the danger of breakage of carriages $h$.

In order to avoid such a danger, it is necessary to use an operator who enters the respective rectangular region in which the fillet welding is effected and untwists the twisting of wires $g$ and cables $i$, thereby limiting the number of devices or carriages which can be handled by an operator while power saving and promotion of automation are deteriorated.

This invention provides an apparatus which avoids the above-described disadvantages of the prior art apparatus.

Embodiment of FIGS. 2–9

As described in detail hereinafter with reference to FIGS. 2–7, this invention is characterized by the provision of a travelling mechanism capable of travelling in the longitudinal direction and the transverse direction above a material to be welded, a clamping mechanism for detecting the existence of the carriages and clamping and holding the same, an extensible and contractible mechanism adapted to suspend said clamping mechanism and move the same upwardly and downwardly, and a swivelling mechanism for swivelling said clamping mechanism about its longitudinal axis.

By the arrangement as described above, the self-propelled carriages can be lifted by the extensible and contractible mechanism after one cycle of fillet welding in each of the rectangular regions has been completed and untwisted so as to return the carriages to their initial orientation by means of the swivelling mechanism and, thereafter, they can be moved to next rectangular regions by the travelling mechanism in which fillet welding is to be carried out and lowered thereonto to effect the fillet welding. This permits extremely efficient fillet welding operation of the rectangular regions without causing any danger of collision of the carriages against the guide members.

Referring now to FIGS. 2–7, the apparatus of this invention comprises a pair of spaced girders 1 movable on a pair of parallel, spaced girder rails 2, a plurality of carriages 4 shiftably supported on rails 3 spanning between girders 1. Rails 3 extend in the direction transverse to the direction of rails 2, so that carriages 4 can be moved in the longitudinal direction and in the transverse direction by the movement thereof along rails 3 and the movement of girders 1 along rails 2.

Figure 2:
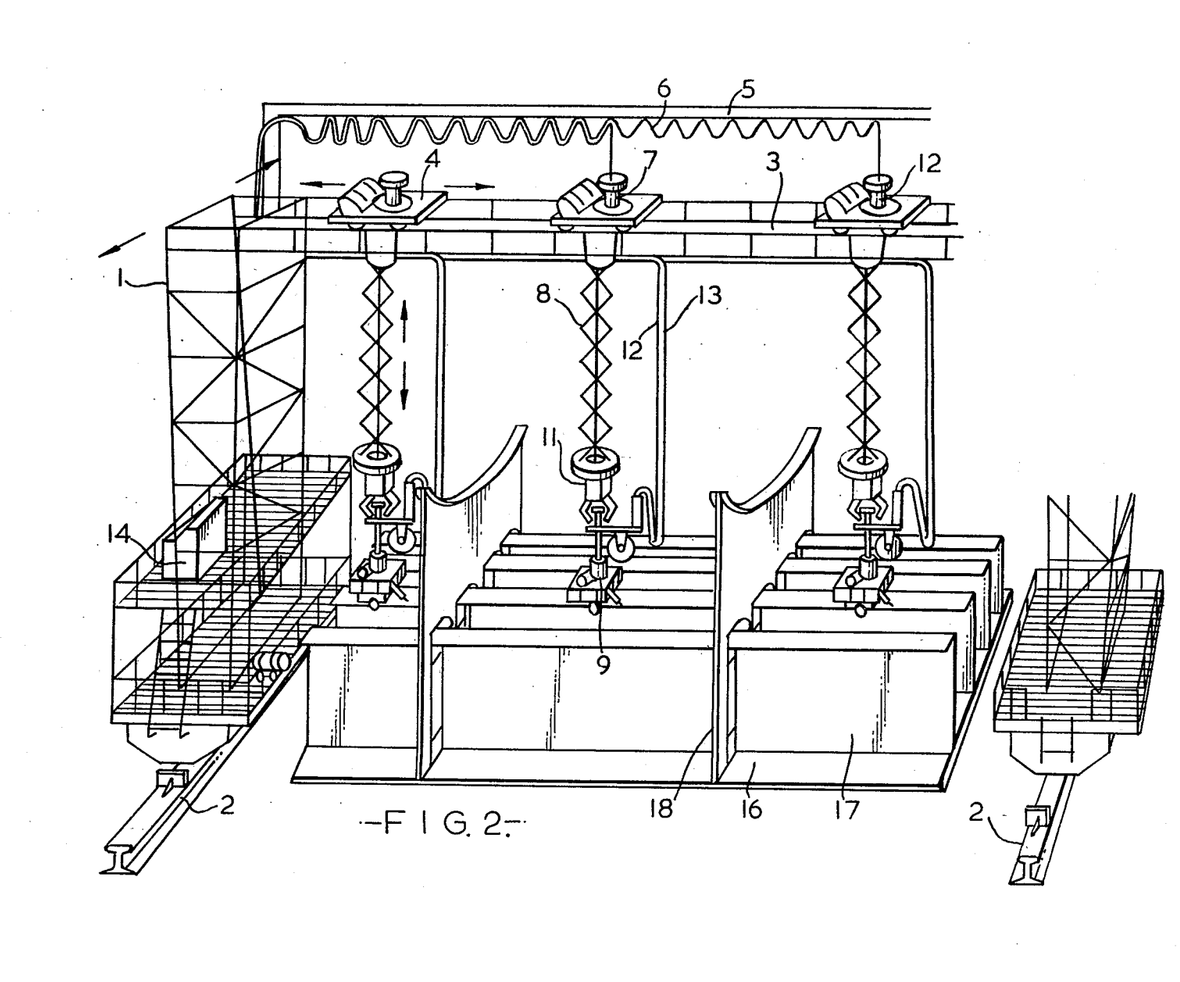
FIG. 2 is a perspective view showing one embodiment of the transporting and collecting apparatus of self-propelled carriages constructed in accordance with this invention.

Cable supporting girder 5 extends in parallel to rails 3 and yieldably supports cables 6 which are connected to the respective carriages 4 so as to supply electric power thereto from exterior source (not shown).

A swivelling or rotating device 7 is provided in each of carriages 4 and a pantograph-type extension ladder 8 is mounted at its upper end to each of rotating device 7 so that extension ladders 8 are rotatable about vertical axes thereof.

Clamping device 11 provided with limit switch 10 for detecting self-propelled welder 9 is mounted on the lower end each of extension ladders 8. Clamping device 11 is adapted to clamp the respective self-propelled welder 9 after limit switch 10 thereof detects the position of self-propelled welder 9.

Each of carriages 4 is connected to the respective welder 9 and the respective clamping device 11 through control cables 12, 13 so that control signals are supplied to welders 9 and clamping devices 11 from a remote control board 14 provided in girder 1 through cables 6 and control cables 12, 13 thereby permitting welders 9 and clamping device 11 to be remote controlled from control board 14.

Figures 3, 5A:
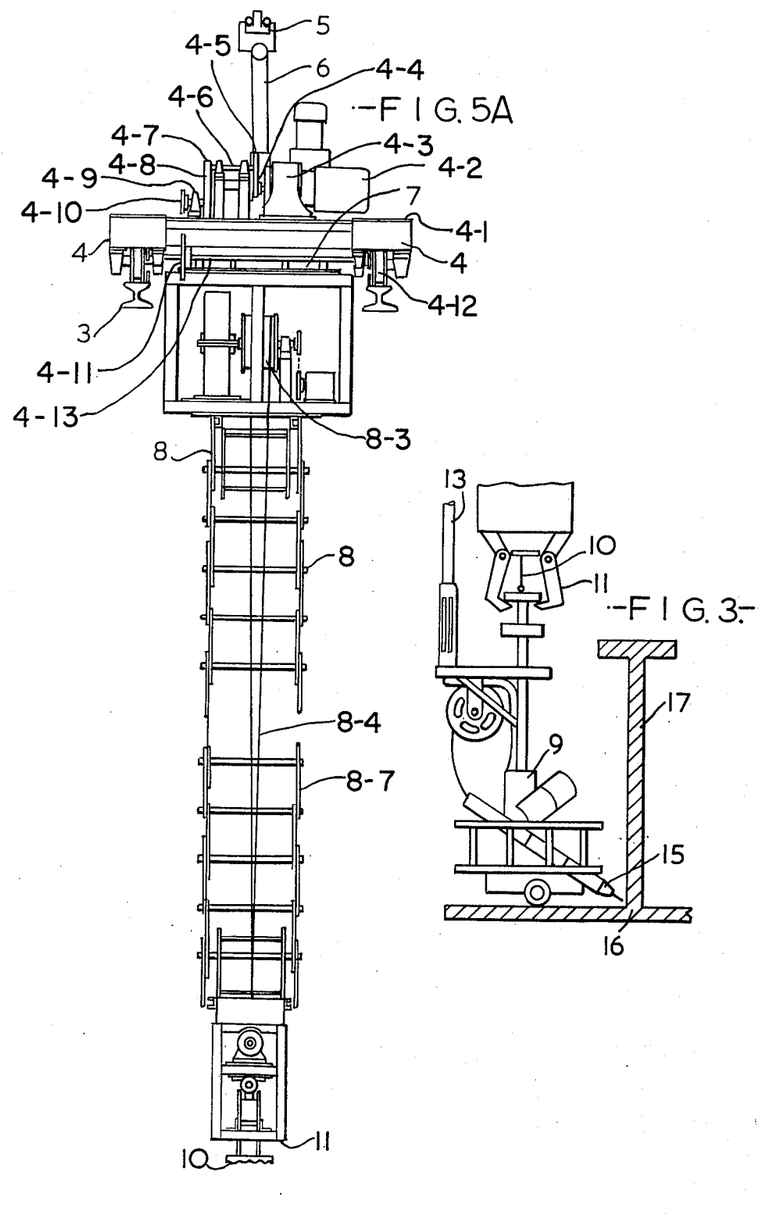
FIG. 3 is a cross-sectional view showing the main portion of the apparatus shown in FIG. 2.
FIG. 5A is a side view of FIG. 4

As shown in FIG. 3, automatic welding torch 15 is mounted on each of self-propelled welders 9.

In operation, plate material 16 to be welded is located on the floor between the pair of girder rails 2 and a plurality of longitudinal guide members 17 are temporarily welded to plate material 16 in parallel to rails 3 and spaced a predetermined distance from each other while a plurality of transverse guide members 18 are temporarily welded to plate material 16 in the direction transverse to the direction of rails 3 and spaced a predetermined distance from each other.

Girders 1 can be so preset that they are moved along the transverse direction by a pitch determined by adjacent blocks or regions in which the welding is to be effected so as to displace each of welders 9 to the next block and to be automatically stopped at the center of the block.

Figure 7:
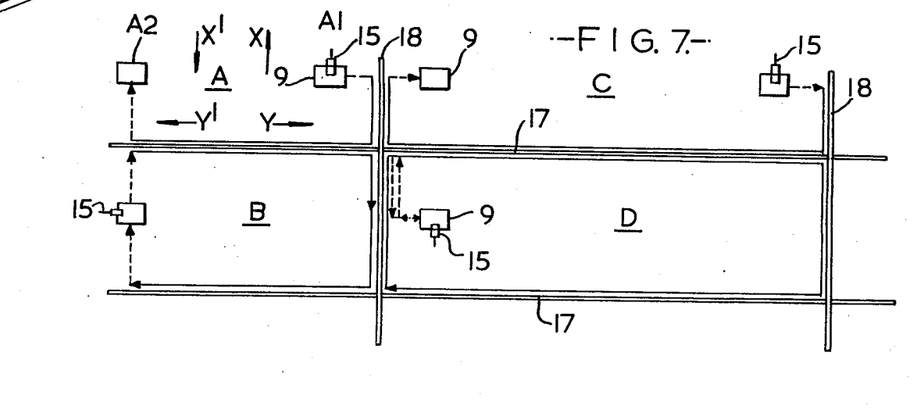
FIGS. 7, 8 and 9 are schematic plan views showing processes of operation of the embodiment shown in FIG. 2.
Figure 8:
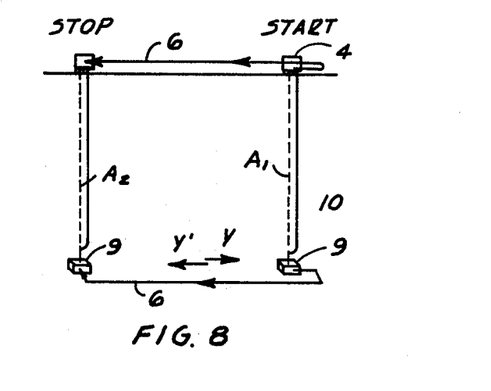

As shown in FIG. 7, in order to effect the horizontal fillet welding in region A by one of welders 9, for example, girders 1 are moved above region A at the center of the longitudinal space defined by region A so that welding torch 15 of welders 9 is directed toward direction X by actuating swivelling device 7 belonging to that welder 9, and, thereafter, extension ladder 8 is extended so as to place self-propelled welder 9 clamped by the respective clamping device 11 at position A in region A, and, thereafter, welder 9 is released and extension ladder 8 is contracted. Then, welder 9 and carriage 4 are moved in direction Y until reaching transverse member 18. Thereafter, torch 15 and swivelling device 7 are rotated 90° in the clockwise direction and welding operation is commenced while self-propelled welder 9 is moving in direction X'. When torch 15 reaches the corner of the region A, torch 15 and swivelling device 7 are rotated 90° in the clockwise direction, then carriage 4 and self-propelled welder 9 are moved in direction Y' so as to commence the welding operation. Carriage 4 and welder 9 are stopped after completion of the welding operation with required portion remaining unwelded and self-propelled welder 9 is moved in direction X by half the pitch of the longitudinal space defined by region A.

After the horizontal fillet welding operation is completed in region A as described above, extension ladder 8 is extended and carriage 4 is moved in the longitudinal direction following the movement of self-propelled welder 9 in the longitudinal direction. Since the position at which self-propelled welder 9 is stopped after the movement thereof in the transverse direction coincides with the start position of self-propelled welder 9 along the movement in the transverse direction, limit switch 10 of clamping device 11 contacts with self-propelled welder 9 so as to issue a signal so that clamping device 11 is actuated to clamp self-propelled welder 9. Then, extension ladder 8 is contracted to lift welder 9 above longitudinal member 17 thereby permitting welder 9 to travel over longitudinal member 17 by the action of girders 1, while swivelling device 7 is actuated to rotate welder 9 in the counterclockwise direction by 180° so that cables 12, 13 are untwisted to the initial state.

Similar operation is repeated in regions B, C, etc. Naturally, self-propelled welder 9 and swivelling device 7 must be rotated 90° by the number of times in coincidence with the number of sides of the region in which the fillet welding is to be effected.

In the embodiment shown, three self-propelled welders are shown as being operated by the pair of girders. The number of welders is not limited to three but may be any number as desired, and they can be simultaneously operated by a single operator who manipulates control board 14 without requiring any additional operator entering the region in which the fillet welding operation is carried out.

The following further description of details may help one gain a more thorough understanding, more readily.

Travelling Means

Figure 4:
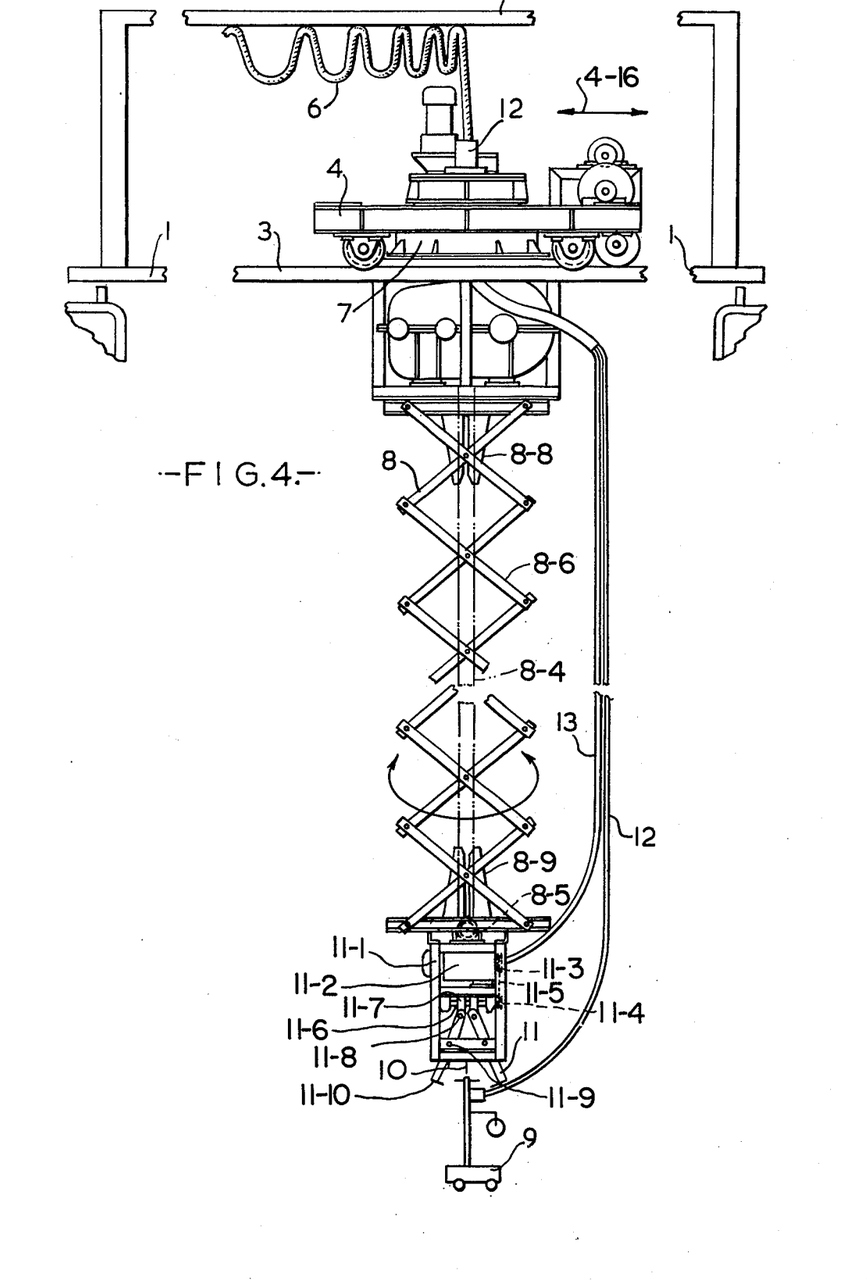
FIG. 4 is a front view showing the embodiment of FIG. 2.
Figure 5B:
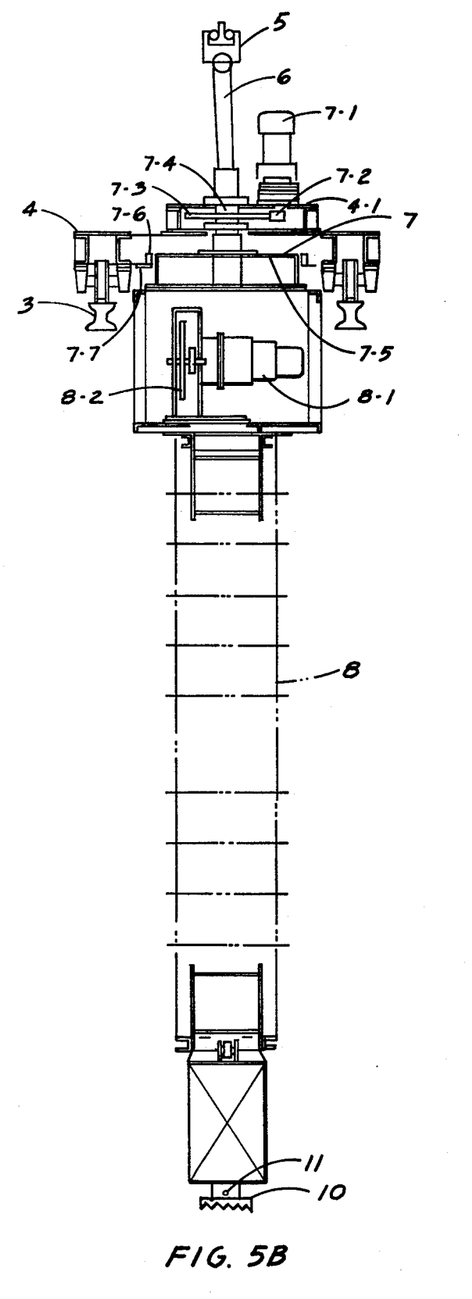
FIG. 5B is a longitudinal sectional view thereof.

Reference numeral 4 designates a traverse carriage as a whole; numeral 4-1 designates a saddle on which an electric motor 4-2 and a speed reduction machine 4-3 are mounted; numeral 4-4 designates a first gear mounted on an output shaft of said speed reduction machine 4-3; numeral 4-5 designates a second gear meshed with said first gear; on a remote end of a shaft 4-6 of the second gear 4-5 is mounted a third gear 4-7; numeral 4-8 designates a fourth gear meshed with said third gear 4-7; on a remote end of a shaft 4-9 of said fourth gear 4-8 is mounted a sprocket wheel 4-10, which is coupled through an endless chain 4-15 to another sprocket wheel 4-14 mounted on an axle 4-13 of wheels 4-12 disposed under the saddle 4-1.

With the above-described construction, the wheels 4-12 are driven by the electric motor 4-2 through the subsequent speed reduction machine, intermediate gears and endless chain, so that the traverse carriage 4 is moved in the Y direction as represented by arrows 4-16 in FIG. 4.

Swivelling Means

Reference numeral 7 designates a swivelling device which is mounted on the saddle of the traverse carriage 4; numeral 7-1 designates an electric motor; numeral 7-2 designates a first gear mounted on an output shaft of the electric motor; numeral 7-3 designates a second gear meshed with said first gear; numeral 7-4 designates a shaft of the second gear, at a remote end of which is stud mounted a swivelling table 7-5, which has a circular shape and is supported by a swivelling support base 7-7 provided under the saddle 4-1 of the above-referenced traverse carriage 4 via cam followers 7-6 provided along its circumference which make rolling contact with the swivelling support base 7-7.

It is to be noted that the swivelling shaft 7-4 is made in a tubular form so that the control cabales 12 and 13 for the self-propelled welder 9 placed thereunder to be transported and collected thereby and the clamping means 11 are passed through the tubular swivelling shaft 7-4 and then suspended.

With the above-mentioned construction, the clamping means and the extensible and contractible means can be driven in rotation about a vertical axis within the traverse carriage 4 by means of the electric motor 7-1, and simultaneously can twist or can release twisting of the control cable 6.

Extensible and Contractible Means

Reference numeral 8 designates an extensible and contractible device which is constructed as follows: that is, an electric motor 8-1 provided under the swivelling table 7-5 is coupled to a winding drum 8-3 via a spur gear 8-2 mounted on an output shaft of the electric motor 8-1. In addition, reference numeral 8-4 designates a wire rope fixedly secured at one end to the winding drum 8-3, and the other end of the wire rope is wound around a sheave 8-5 mounted on a clamping device 11 at the bottom. The lower end of the swivelling table 7-5 and the upper end of a frame of a clamping device (11-1 as described later) are coupled by an assembled pantograph mechanism 8-7 consisting of a link mechanism including a plurality of extensible and contractible arms 8-6.

With the above-described construction, the lower clamping device 11 is raised or lowered by the electric motor 8-1 via the wire rope 8-4, and then the pantograph 8-7 constrains twisting of the wire rope 8-4 and enables the clamping device 11 to be raised or lowered almost vertically without swinging or rotation.

Clamping Means

Figure 6:
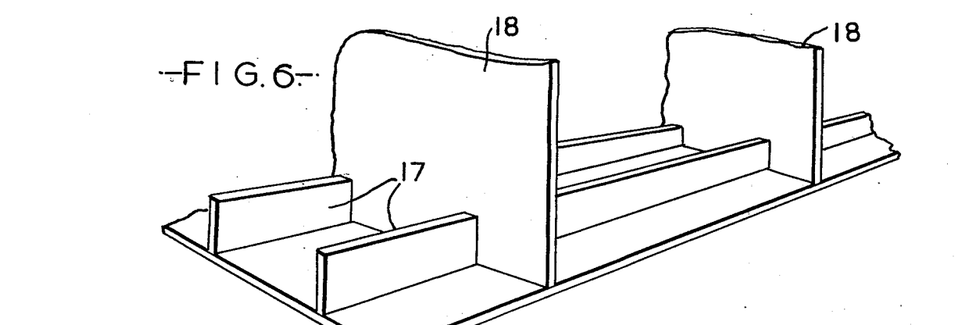
FIG. 6 is a perspective view in enlarged scale showing the main portion in FIG. 2.

Reference numeral 11 designates a clamping device, in which numeral 11-1 designates its frame; numeral 11-2 designates an electric motor accommodated therein and fixedly secured thereto; numeral 11-3 designates a first sprocket wheel mounted on an output shaft of the electric motor 11-2; numeral 11-4 designates another sprocket wheel opposed to the first sprocket wheel 11-3; numeral 11-5 designates an endless chain engaged with both the sprocket wheels; and numeral 11-6 designates a screw rod forming a shaft of the second sprocket wheel 11-4, which is threaded differently with right-handed screw and left-handed screw at its different half portions on the opposite sides of the center along its lengthwise direction, and on the screw rod 11-6 are mounted movable pieces 11-7 having female screws engaged with the respective halves. To the respective movable pieces 11-7 are mounted, via pins 11-8, arms 11-10 which are pivotably mounted via pins 11-8.

In this way, when the screw rod 11-6 is rotated by the electric motor 11-2, the movable pieces 11-7 threadedly engaged therewith will move in the opposite directions to each other, resulting in opening and closing operations of the arms 11-10, so that the arms 11-10 can clamp or release the upper portion to be clamped of the self-propelled welder 9 placed thereunder.

At first, the traverse carriage 4 transports the self-propelled welder 9 up to the position right above the point A1 in FIG. 7, and then the extensible and contractible device 8 is extended and the clamping device 11 is released to place the self-propelled welder 9 on the base plate at the point A1.

Figure 9:
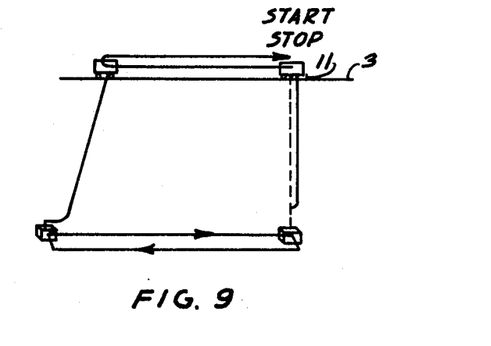

Subsequently, upon travelling the self-propelled welder 9 and the traverse carriage 4 is the Y- and Y'-directions (exactly, the self-propelled welder 9 is also travelled in the X- and X'-directions), either their travelling speeds are controlled so as to be equal in magnitude and in direction and thereby their relative positioning is maintained always constant (see FIG. 8), or assuming that the self-propelled welder 9 itself has a function of automatically returning to its start point, its stopping position is made to coincide with its start point, and the traverse carriage 4 is made to follow the self-propelled welder 9 within such range that the control cable 6 of the self-propelled welder 9 suspended from the traverse carriage 4 may not be drawn, and is made to automatically stop by means of a stopper or a limit switch that is preliminarily provided on the rail 4 when it comes back to its original start position (see FIG. 9). Then, upon collecting operation of the self-propelled welder, since the traverse carriage 4 and the self-propelled welder 9 align on the same vertical axis, if the clamping device 11 is lowered by extending the extensible and contractible device 8, existence of the self-propelled welder 9 can be detected by the limit switch provided at the extremity of the clamping device 11.

In other words, according to the present invention, with regard to the 2-dimensional motion along a horizontal plane of the transverse carriage 4 and the self-propelled welder 9, relative position control for the respective devices is carried out, while the axial movement of the extensible and contractible device 8 is controlled by the limit switch 10, and simultaneously the clamp device 11 is jointly controlled by the limit switch 10.

In this case, the limit switch 10 mounted under the clamping device 11 (in the illustrated structure, between the arms 11-10) can detect existence of the self-propelled welder 9 by touching the portion to be clamped of the self-propelled welder, and in response to the detected signal, the electric motor 11-2 is started or stopped to control the clamping and releasing operations.

It should now be apparent that the Apparatus For Transporting And Collecting Self-Propelled Carriages, as described hereinabove, possesses each of the attributes set forth in the specification under the heading "Summary of the Invention" hereinbefore. Because the Apparatus For Transporting And Collecting Self-Propelled Carriages can be modified to some extent without departing from the principles of the invention as they have been outlined and explained in this specification, the present invention should be understood as encompassing all such modifications as are within the spirit and scope of the following claims.

We claim:

1. Apparatus for welding upon material from above, at a work station having a plurality of longitudinally-spaced work sites, comprising:

at least one travelling means;

a travelling means support structure disposed over the work station and providing for longitudinal and transverse movement of the travelling means in a horizontal plane over the work station;

at least one self-propelled welder that is separate from the travelling means, the self-propelled welder having structure providing the capability of rotating and travelling freely upon the material to be welded;

a control cable extending upwards from the self-propelled welder to the vicinity of the travelling means support structure;

a hoist mounted on the travelling means, and including upper sheave means, suspended lower sheave means, cable means entrained about the upper and lower sheave means, and cable payout and take-up means associated with the cable means for raising and lowering the lower sheave means relative to the upper sheave means;

at least one clamping means for clamping and holding the self-propelled welder, the clamping means being mounted on the lower sheave;

the clamping means including two legs associated with one another for movement relatively toward and away from one another for grasping and releasing the self-propelled welder;

a motor mounted on the lower sheave means and having an output shaft means provided with two screw-threaded sections of opposite-hand threading relative to one another;

each screw-threaded section being threaded to a respective clamp leg, so that operation of the motor in one sense moves both clamp legs to grasp the self-propelled welder and operation of the motor in another sense moves both clamp legs to release the self-propelled welder;

a limit switch mounted on the lower sheave means, the limit switch being disposed, when the clamping means is to grasp the self-propelled welder, for contact with the self-propelled welder when the limit switch becomes lowered with the lower sheave means until the limit switch is in operative contact with the self-propelled welder;

the limit switch being connected with the motor for activating the motor upon making said operative contact, to cause the clamp legs to grasp the self-propelled welder;

extensible, contractible anti-rotation means suspending the clamping means from the travelling means while permitting vertical movement of the clamping means due to operation of the hoist; and swivelling means operatively interposed between the clamp legs and the travelling means support structure, the swivelling means having structure providing the capability of swivelling the self-propelled welder, while the self-propelled welder remains grasped by the clamping means, for untwisting the control cable when the same has become twisted due to net rotation of the self-propelled welder in one angular sense during self-propulsion thereof.

* * * * *